(12) United States Patent
Agrawal et al.

(10) Patent No.: US 10,909,100 B2
(45) Date of Patent: Feb. 2, 2021

(54) OBJECT IDENTIFIER INDEX

(71) Applicant: Google LLC, Mountain View, CA (US)

(72) Inventors: Shireesh Agrawal, Sunnyvale, CA (US); Moises Morgenstern Gali, San Francisco, CA (US); Sumedha Swamy, San Jose, CA (US); Hongjie Bai, Union City, CA (US)

(73) Assignee: Google LLC, Mountain View, CA (US)

( * ) Notice: Subject to any disclaimer, the term of this patent is extended or adjusted under 35 U.S.C. 154(b) by 468 days.

(21) Appl. No.: 15/695,584

(22) Filed: Sep. 5, 2017

(65) Prior Publication Data

US 2019/0073389 A1 Mar. 7, 2019

(51) Int. Cl.
| | |
|---|---|
| *G06F 16/00* | (2019.01) |
| *G06F 16/22* | (2019.01) |
| *G06F 16/951* | (2019.01) |
| *G06F 16/955* | (2019.01) |
| *G06F 16/95* | (2019.01) |
| *G06Q 30/06* | (2012.01) |
| *G06Q 30/02* | (2012.01) |

(52) U.S. Cl.
CPC ............ *G06F 16/22* (2019.01); *G06F 16/95* (2019.01); *G06F 16/951* (2019.01); *G06F 16/9566* (2019.01); *G06Q 30/02* (2013.01); *G06Q 30/0629* (2013.01); *G06Q 30/0641* (2013.01)

(58) Field of Classification Search
CPC ...... G06F 16/22; G06F 16/95; G06F 16/9566; G06F 16/951; G06Q 30/02; G06Q 30/0629; G06Q 30/0641
See application file for complete search history.

(56) References Cited

U.S. PATENT DOCUMENTS

| | | | |
|---|---|---|---|
| 5,918,214 A | 6/1999 | Perkowski | |
| 7,421,441 B1 * | 9/2008 | Chan | ............... G06F 16/951 |
| 8,688,534 B2 | 4/2014 | Kubicki et al. | |
| 9,037,585 B2 | 5/2015 | Kubicki et al. | |

(Continued)

OTHER PUBLICATIONS

PCT International Search Report and Written Opinion issued in International Application No. PCT/US2018/037403, dated Aug. 27, 2018, 15 pages.

(Continued)

*Primary Examiner* — Taelor Kim
*Assistant Examiner* — Lahcen Ennaji
(74) *Attorney, Agent, or Firm* — Fish & Richardson P.C.

(57) ABSTRACT

A data processing system generates a mapping between entries in an index to determine an object represented by digital content of a network address. The system includes a network interface system that receives script data and a content title of digital content; a data retrieval interface that retrieves executable logic; a parsing engine that executes the executable logic to extract an identifier of an object; a search engine that searches an index to identify a first entry with indexed data representing a descriptor of the object for which the identifier is extracted; and a mapping engine that generates, in the index, a second entry with data representing the content title of the digital content and with data representing the identifier of the object that is referenced by the digital content accessible at the network address, and a mapping between the first entry and the second entry.

15 Claims, 4 Drawing Sheets

(56) References Cited

U.S. PATENT DOCUMENTS

| | | | |
|---|---|---|---|
| 2002/0099723 A1* | 7/2002 | Garcia-Chiesa | G06F 16/951 |
| 2005/0010486 A1* | 1/2005 | Pandhe | G06Q 30/02 |
| | | | 705/26.8 |
| 2005/0256865 A1* | 11/2005 | Ma | G06F 16/951 |
| 2007/0276808 A1 | 11/2007 | McGushion | |
| 2008/0154951 A1* | 6/2008 | Martinez | G06Q 30/02 |
| 2009/0019105 A1 | 1/2009 | Sebastian | |
| 2012/0136926 A1 | 5/2012 | Dillon | |
| 2013/0066675 A1* | 3/2013 | Bercaw | G06Q 30/0201 |
| | | | 705/7.29 |
| 2013/0103666 A1* | 4/2013 | Sandberg | G06F 16/9566 |
| | | | 707/709 |
| 2014/0249964 A1 | 9/2014 | Kubicki | |
| 2015/0121035 A1* | 4/2015 | Steele, Jr. | G06F 12/1018 |
| | | | 711/216 |

OTHER PUBLICATIONS

EP Office Action in European Application No. 18740936.2, dated Jun. 15, 2020, 8 pages.
PCT International Preliminary Report on Patentability in International Application No. PCT/US2018/037403, dated Mar. 10, 2020, 10 pages.

* cited by examiner

OBJECT IDENTIFIER INDEX

TECHNICAL FIELD

This disclosure relates generally generating an index of object identifiers in a networked computing system.

BACKGROUND

The Internet provides access to a wide variety of resources. For example, content providers serve video, audio, and Web pages over the Internet. Content providers determine what content that users are interested in and provide targeted content to those users.

SUMMARY

The data processing system described herein provides several advantages. The data processing system generates an object identifier index that enables targeted digital content to be served to a client device. Specifically, the object identifier index enables digital content to be served, the digital content relating to the object(s) in which a user of a client device has indicated an interest (e.g., by selecting content related to the object(s)). The data processing system uses the object identifier index to determine the object to interest for the user of the client device by using a static script tag embedded in digital content (e.g., a web page) served by the content provider (e.g., a publisher). The static script tag is simpler and less prone to causing errors than a dynamic script tag, which requires customized configuration and ongoing support for each individual content provider. Bypassing the use of a dynamic script tag to retrieve object identifiers improves the existing technological process because the static script tag represents a standardized, robust alternative that is integrated in a content provider's computing system more quickly than a dynamic tag and that requires little or no ongoing support or updating as the content provider updates content of the content provider's domain. The data processing system reduces errors in returning targeted content to client devices, relative to a system using dynamic tags, and enables content providers to provide targeted content more quickly and effectively than a system that uses dynamic script tags.

In addition to simplifying the setup process and reducing maintenance overhead for delivering targeted digital content, the object identifier index of the data processing system enables faster lookup times for retrieving identifiers of objects of interest of the user of a client device, relative to lookup times for retrieving identifiers of objects using a non-indexed object identifier list. The data processing system builds the object identifier index in advance of client device requests for data from content providers. The content provider does not need to send an additional request for data (e.g., cached data in a browser application) from the client device. When the client device requests content from the content provider, the content provider executes the script tag and determines the identity of the client device and which objects a user associated with the device has shown interest in (e.g., selected, viewed, etc.). The content provider sends this data to an evaluation platform (e.g., an ad exchange), which then uses the object identifier index to determine which objects are of interest to the user. The evaluation platform determines which targeted digital content items to provide to the content provider that the content provider serves along with other content (e.g., web page data). By gathering object identifier information using the static script tag, the evaluation platform does not need to send additional requests for data from the client device, reducing bandwidth usage in the networked computer environment, relative to bandwidth usage of a system that does not gather object identifier information when content is requested by the client device.

This document describes a network interface system that receives script data specifying a network address and a content title of digital content accessible at the network address, where the network address comprises domain data; a data retrieval interface that retrieves, based on the domain data of the network address, executable logic for parsing the network address; a parsing engine that executes the executable logic to extract, from the network address, an identifier of an object that is referenced by the digital content accessible at the network address; a search engine that searches an index to identify a first entry with indexed data representing a descriptor of the object for which the identifier is extracted; and a mapping engine that generates, in the index, a second entry with data representing the content title of the digital content accessible at the network address and with data representing the identifier of the object that is referenced by the digital content accessible at the network address and that generates, in the index, a mapping between the first entry and the second entry.

In some implementations, the descriptor includes an object title that describes a product represented by the descriptor. In some implementations, the second entry includes two sub entries that are linked together. In some implementations, the network interface receives the script data in response to execution of logic embedded in the digital content accessible at the network address.

In some implementations, the logic embedded in the digital content at the network address is embedded in a static script tag of the digital content at the network address. In some implementations, the mapping engine matches the identifier of the object to a stored object title based on the mapping of the first entry to the second entry in the index.

In some implementations, the index enables a retrieval of a content item representing the object with a reduced latency relative to a latency caused by retrieval of the content item representing the object independent of the index.

In some implementations, the parsing engine analyses a plurality of network addresses of a domain specified by the domain data and compares each of the plurality of the network address to other network addresses of the plurality to determine an additional one or more rules for the domain specified by the domain data.

In some implementations, the mapping engine determines that stored object titles are related based on comparing identifiers each mapped to a respective stored object title of the stored object titles. In some implementations, the identifier comprises a product identifier, and where the object comprises a product. In some implementations, the content title is a first content title, and where a second content title is not unique from the first content title, and where upon detection of non-unique second content title, the mapping engine removes, from the index, the first entry including the first content title and an additional entry including the second content title. In some implementations, the mapping engine maps the first entry and the second entry using a lookup table.

In some implementations, one or more processing devices are configured to perform operations including receiving script data specifying a network address and a content title of digital content accessible at the network address, where the network address comprises domain data; retrieving, based on the domain data of the network address, executable logic for parsing the network address; executing the executable logic to extract, from the network address, an identifier of an object that is referenced by the digital content accessible at the network address; searching an index to identify a first entry with indexed data representing a descriptor of the object for which the identifier is extracted; and generating, in the index, a second entry with data representing the content title of the digital content accessible at the network address and with data representing the identifier of the object that is referenced by the digital content accessible at the network address and that generates, in the index, a mapping between the first entry and the second entry.

In some implementations, the descriptor includes an object title that describes a product represented by the descriptor. In some implementations, the script data is received in response to execution of logic embedded in the digital content accessible at the network address.

In some implementations, the logic embedded in the digital content at the network address is embedded in a static script tag of the digital content at the network address. In some implementations, the operations include matching the identifier of the object to a stored object title based on the mapping of the first entry to the second entry in the index.

In some implementations, the index enables a retrieval of a content item representing the object with a reduced latency relative to a latency caused by retrieval of the content item representing the object independent of the index.

In some implementations, the operations include analyzing a plurality of network addresses of a domain specified by the domain data and compares each of the plurality of the network address to other network addresses of the plurality to determine an additional one or more rules for the domain specified by the domain data.

In some implementations, a non-transitory computer readable medium stores instructions operable to cause one or more processing devices to perform operations including receiving script data specifying a network address and a content title of digital content accessible at the network address, where the network address comprises domain data; retrieving, based on the domain data of the network address, executable logic for parsing the network address; executing the executable logic to extract, from the network address, an identifier of an object that is referenced by the digital content accessible at the network address; searching an index to identify a first entry with indexed data representing a descriptor of the object for which the identifier is extracted; and generating, in the index, a second entry with data representing the content title of the digital content accessible at the network address and with data representing the identifier of the object that is referenced by the digital content accessible at the network address and that generates, in the index, a mapping between the first entry and the second entry.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

Figure 1:
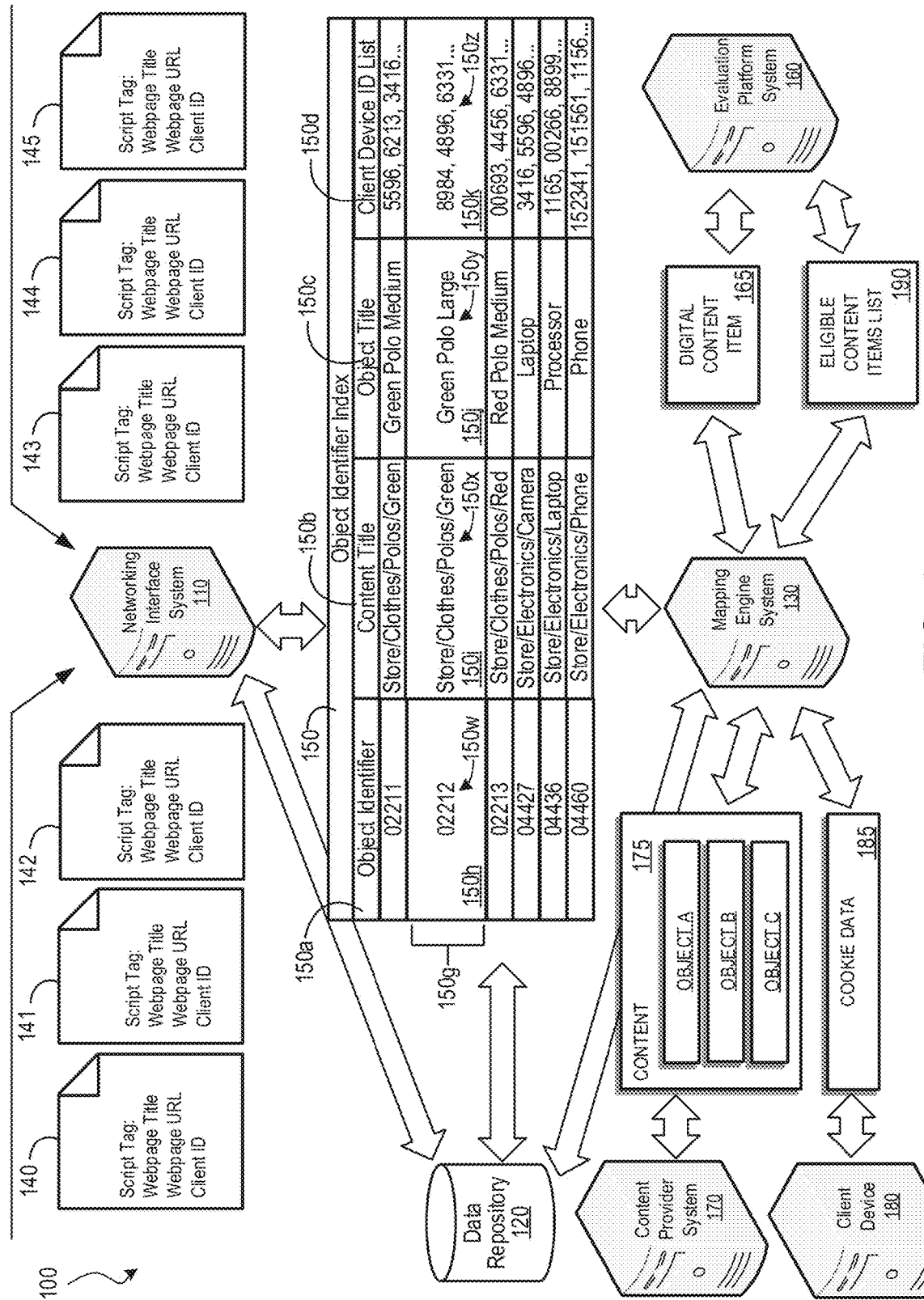
FIG. 1 is a diagram of a data processing system that accesses an object identifier index.

Referring to FIG. 1, a data processing system 100 includes content provider system 170, and client device 180. The data processing system 100 includes networking interface system 110, data repository 120, mapping engine system 130, and evaluation platform system 160. The mapping engine system 130 generates an object identifier index 150 for associating a client device 180 with one or more objects that have been identified as of interest to a user of the client device 180.

The object identifier index 150 includes entries that form columns and rows in the object identifier index 150. Each column includes a plurality of entries that have a similar type of data. In this example, the object identifier index 150 includes an object identifier column 150a, content title column 150b, object title column 150c, and client device identifier list column 150d.

The object identifier index 150 includes rows. The rows include entries that are related to one another. For example, row 150g includes entries 150h-k. Entry 150h includes data 150w representing object identifier 02212 (hereinafter, referred to as object identifier 150w). The object identifier 150w includes a unique code that distinguishes the object from other objects and that can be used by computing systems as a reference for the object. Entry 150i includes data 150x representing content title "Store/Clothes/Polos/Green" (hereinafter, referred to as content title 150w). The content title 150w includes a title (e.g., a webpage title) of the web site in which the object is being referenced, and the website includes content 175 that is published or displayed to the user on the client device 180. Entry 150j includes data 150y representing object title "Green Polo Large" (hereinafter, referred to as object title 150y). The object title includes a descriptor of the object that distinguishes the object from other objects. Entry 150k includes data 150z representing a list of client devices associated with the object identifier (hereinafter, referred to as list 150z). The client device identifiers include references to the devices of the users. The entries 150h-k and data 150w-z are examples for illustrating the behavior of the object identifier index 150.

A user of the client device 180 (e.g., laptop, mobile phone, desktop, tablet, etc.) browses content (e.g., websites) hosted by the content provider system 170 over a network. Websites include one or more resources hosted by one or more servers of the content provider system 170. An example website is a collection of webpages formatted in hypertext markup language (HTML) that includes text, images, multimedia content, and programming elements, such as scripts. Each website is maintained by a content provider (e.g., a publisher), which may be an entity that controls, manages and/or owns the website. In some implementations, the data processing system 100 may be hosted by one or more of the servers that host websites (and may be part of the resources provided by websites). In some implementations, the data processing system 100 may be part of another system. In some implementations, the data processing system 100 may be distributed among various hardware elements shown in the network of FIG. 1.

The content provider system 170 sends content 175 to the client device 180. The content 175 includes data that is provided over a network from a content provider system 170. The content 175 is identified by a content identifier (e.g., network address, portion of a network address, etc.) that is associated with the content. The content 175 includes one or more of HTML pages, word processing documents, portable document format (PDF) documents, images, video, and news feed sources, etc. The content 175 includes one or more of words, phrases, images and sounds. The content 175 includes embedded information (such as meta-information hyperlinks) and/or embedded instructions, such as a script tag. In this example, networking interface system includes scripts tags 140-145. For example, the script tag 140 includes one or more of executable scripts, code snippets, etc. Examples of the content 175 also include information about keywords, online video, electronic commerce, or any other subject for which a graphic is generated. The content 175 can include references to one or more objects, such as object A, object B, or object C, as shown in FIG. 1.

A digital content item 165 associated with an object (e.g., a product, good, service, etc.) may be provided to client devices (such as the client device 180) based on the content 175 that was previously accessed by the client device 180. In some implementations, the digital content item 165 is an advertisement. For example, in response to the client device 180 requesting the content 175 from a content provider system 170, the mapping engine system 130 infers an interest, by a user, in an object (e.g., objects A, B, and/or C) referenced by the content 175. The mapping engine system 130 classifies the client device 180 of the user into one or more audience segments (e.g., lists of client devices associated with the respective objects A, B, and/or C). For example, the client device 180 requests the content 175 including data related to object A (e.g., a webpage for purchasing object A). The mapping engine system 130 classifies the client device 180 into an audience segment that represents users interested in object A.

In some implementations, upon classifying the user into the audience segment, the mapping engine system 130 stores cookie data 185 on the client device 180. The cookie data 185 includes data indicating that the user has an interest in the object. The cookie data 185 (and thus inference of interest in the object) is set based on the user's membership in the audience segment.

When the client device 180 accesses the content 175 hosted by the content provider system 170, the script tag 140 (or one of script tags 141-145) causes the content provider system 170 to execute a script that associates the client device 180 with the content 175 being accessed by the client device 180. The script tag 140 sets the cookie data 185 for the client device 180. The script tag 140 causes the content provider system 170 to send data to the networking interface system 110 for adding data representing the client device 180 to the audience segment associated with the object represented in the content 175 accessed by the client device 180. The mapping engine system 130 generates, for each object, a client device identifier list 150*z* of client devices that have some association with the object based on accessing content representing the object.

To determine which objects to associate with which devices, the mapping engine system 130 analyzes other data sent by the content provider system 170 after execution of the script tag 140. The content provider system 170 sends, to the networking interface system 110 of the data processing system 100, data including the content title 150*x* (e.g., a webpage title as specified by HTML fields) of the content 175 in which the script tag 140 is embedded. The content provider system 170 sends, to the networking interface system 110, a content identifier (e.g., webpage identifier including a uniform resource locator (URL)). The content provider system 170 sends, to the networking interface system 110, the client device identifier, such as described above. The script tag 140 (and script tags 141-145) show representative data that is sent to the networking interface system 110 when the script tag 140 (or script tags 145) is executed.

The script tag 140 is a static script tag because it does not require custom input values to be encoded in the script that dynamically request data from the content provider system 180 when the script is executed. The script tag 140 does not need to be customized for a particular content provider system 170 or content provider webpage. For example, script tag 140 is implemented for many different content provider systems that are each different from one another without changing one or more parameters of the script tag 140 code. In contrast, a dynamic script tag requires one or more unique values to be input into fields of the script tag code that varies between different content provider systems.

Since dynamic script tags require some customization, implementation can be error-prone and can take a long time relative to an amount of time for implementation of a static script tag, such as script tag 140. For example, a content provider system 170, to implement a dynamic tag, customizes one or more fields of the dynamic tag for different webpages of the content provider system. If an operator of the content provider system 170 makes a mistake, the dynamic script tag returns inaccurate data or does not return data.

The script tag 140 is a static script tag, and can be implemented uniformly and automatically across many different content provider systems. Since implementation of the script tag 140 is simpler than a dynamic script tag implementation, the implementation is less error prone and reliably sends data for mapping into the object identifier index. The script tag 140 does not explicitly cause the content provider system 170 to return an object identifier for an object represented in the content (e.g., webpage) of the content provider system 170 because doing so includes script tag customization for each content provider system, which is labor intensive and error-prone, as described above.

The mapping engine system 130 determines the identification of an object represented by the content of a content provider system 170, when the content is accessed by the client device 180. The mapping engine system 130 determines the object identifier of the object based on the data provided by the script tag 140. The mapping engine system 130 analyzes the content title 150*x* and the content identifier provided by the script tag 140 to the networking interface system 110.

When analyzing a content title 150*x* specified by the script tag 140 (and stored in an entry in column 150*b*), mapping engine system 130 uses a set of rules to determine the object identifier 150*w* (e.g., product identifier) for associating with the client device 180 in a client identifier list 150*z* in the object identifier index 150. In some implementations, the content title 150*x* includes a webpage title of the HTML of the webpage in which the object is being represented.

In some implementations, the mapping engine system 130 performs a semantic analysis on a content title (e.g., content title 150*x* specified by an entry in content title column 150*b*) to determine the object identifier 150*w*. The mapping engine system 130 compares the content title 150*x* to an object title 150*y* in an object feed (e.g., a library of objects registered in the repository 120). For example, one or more terms of the object title 150*y* can be present in the website title, such as brand name, a product name, a version number, a product number, etc. The semantic analysis is a part of a machine learning system, such as a deep learning or neural network that includes one or more classifiers.

The mapping engine system 130 uses one or more rules to increase the quality of the object identifier index 150. For example, if a content title 150x is matched to more than two objects, the content title is discarded as generic, rather than being indicative of a particular object. The mapping engine system 130 removes, from the index, content titles (such as content title 150x) that are associated with more than two or three object identifiers because it is less likely that the mapping engine system 130 determines for which object of the more than two or three identifiers there is interest of the user. For example, if one or more objects are no longer represented by a content provider system 180, the content provider system redirects the client device to a second webpage. The second webpage can be a homepage, a "sold out" page, etc. The second webpage can thus be incorrectly associated with many objects if the mapping engine system 130 does not remove generic content titles from the object identifier index 150.

The mapping engine system 130 groups similar content titles into groups. The groups are associated with a class of objects, and when a user is interested in an object of the class of objects, content associated with any object of the group is sent to the client device 180 of the user. For example, a class of objects includes objects having the same product number except for a change in size, color, type, etc. In some implementations, a group identifier is used to associate the object identifier 150w to the client device 180. For example, the objects in the class include a portion of the object identifier 150w that is identical to other object identifiers of the class, such as a product number or category designation. The mapping engine system 130 uses the group identifier to ensure that similar object titles of column 150c and content titles of column 150b are not mistakenly classified as generic.

The mapping engine system 130 parses the HTML code (or other webpage or content code used to render the content) and uses patterns of the code to determine object identifiers to associate with the client device 180. For example, the webpage title and the object title 150y are similar for many webpages and the objects they represent. The mapping engine system 130 uses an edit distance between the object title 150y and the content title 150x to further increase the accuracy of the object identifier index 150. For example, if the edit distance is greater than a threshold value, the mapping engine system 130 assumes that the object title 150y and the content title 150x are not necessarily semantically linked. To conserve memory, content titles of column 150b are truncated to a particular length, such as 256 bytes.

The mapping engine system 130 includes a search engine. The search engine searches the object identifier index 150 to identify the entry (e.g., entry 150j) with indexed data representing the object title (e.g., 150y) of the object for which the content title 150x matches. The mapping system 130 then maps another entry (e.g., entry 150i) including the content title 150x to the entry 150j including the object title 150y. The client device identifier that was received from the content provider system 170 is also included in an entry (e.g., entry 150k) that is mapped to the entry 150j including the object title 150y.

The mapping engine system 130 uses a content identifier (e.g., the webpage URL, network address, etc.) to determine the object identifier 150w of the object represented in the content. The content identifier is parsed to determine whether the object identifier 150w is included in the content identifier. The mapping engine system 130 determines, based on the data received from the content provider system 170, a domain of the content provider system. The domain of the content provider system 170 is indicative of a format of the content identifier, such as where the object identifier 150w is located in the content identifier for product pages of the domain. For example, a domain includes many webpages, each with similar network addresses that might vary with sequential numbering. The mapping engine system 130 includes a data retrieval interface. The data retrieval interface retrieves, based on the domain data of the content identifier, executable logic for parsing the content identifier, the executable logic including a rule set. The data retrieval interface retrieves the executable logic from the repository 120.

The mapping engine system 130 includes a parsing engine. The parsing engine executes the executable logic (e.g., the rule set) to extract, from the content identifier, an object identifier (e.g., object identifier 150w) of an object that is referenced by the content 175 accessible at the network address specified by the content identifier.

The mapping engine system 130 develops the rule set for parsing the content identifiers using machine learning (deep learning, neural networks, etc.). In some implementations, the mapping engine system 130 analyzes the content identifiers of an entire domain or multiple domains together for determining a pattern in the content identifiers. The pattern is indicative of an object identifier 150w that is in the content identifier. For example, a pattern for a domain might indicate that the object identifier 150w is in each content identifier for the domain as the last path component of URLs for each webpage of the domain. In some implementations, a semantic analysis of the content identifiers of a domain enables a determination by the mapping engine system 130 that the object identifier 150w appears at a specific offset after a common term or phrase of the content identifiers. For example, if a URL specifies www.website.com/productid=12345 the mapping engine system 130 determines that the object identifier is one space offset from the term "productid," and that for this URL, the object identifier is 12345.

Once the object identifier 150w is determined for a webpage, the mapping engine system 130 stores one or more of the object identifier, the content title 150x, the object title 150y, and the client device identifier(s) list 150z that have been found to be related to one another in entries in the object identifier index 150. The search engine searches the object identifier index 150 to identify the entry (e.g., entry 150j) with indexed data representing the object title (e.g., 150y) of the object for which the identifier is extracted. The mapping system 130 then maps another entry (e.g., entry 150h) including the object identifier (e.g., object identifier 150w) to the entry 150j including the object title 150y. Since the object title entry 150j is mapped to the client device entry 150k and the content title entry 150i, the object identifier entry 150h is also mapped to the client device identifier entry 150k.

The evaluation platform system 160 uses the object identifier index 150 to determine which digital content item 165 (e.g., product ad) should be sent to the content provider system 170 for presenting with the content of the content provider system. For example, when a client device identifier of the list 150z and the object identifier 150w are in an entry of the object identifier index 150, the evaluation platform system 160 marks a digital content item 165 for the object as eligible to be selected for presentation along with the content of the content provider system 170. The eligible content items list 190 includes the list of digital content items representing objects (e.g., products) that are of interest to the user of the client device 180. The eligible content items list 190 is sent to the evaluation platform system 160 as a "pool" of digital content items from which a digital content item 165 can be selected for serving to the client device 180 along with the content 175 that is being requested.

Data repository 120 stores the object identifier index 150. The repository 120 is a part of the data processing system 100. The repository 120 is accessible by one or more of the mapping engine system 130, the evaluation platform system 160, and the networking interface system 110 for generating the object identifier index 150.

The evaluation platform 160, which serves digital content item 165, receives a request from the website for a digital content item 165 (e.g., an ad) relating to the object in which the client device 180 has matched an object identifier 150w. The evaluation platform system 160 provides appropriate content to the content provider system 170 which, in turn, incorporates that digital content item 165 into the content of the webpage, and outputs the content to the user, along with the remainder of the webpage content. The content 175 and the digital content item 165 are displayed on a computing device, such as the client device 180. In some implementations, when displayed, the digital content item 165 is incorporated into an appropriate slot. The user of the client device 180 may select the ad by clicking-on the ad. In response, a hyperlink associated with the ad directs the user to another webpage. For example, if the digital content item 165 is for product ABC, the webpage to which the user is directed may be the home page for ABC Product Store. This type of content access is known as click-through. In this context, a "click" is not limited to a mouse click, but rather may include a touch, a programmatic selection, or any other interaction by which the digital content item 165 may be selected.

The evaluation platform system 160 runs a content evaluation (e.g., an auction) to determine which digital content item 165 is to be output in response to receipt the one or more client device identifier lists (such as list 150z) and mapped object identifiers (such as object identifier 150w). In the evaluation, providers of digital content items submit eligibility values on specific keywords (which are associated with content). The evaluation platform system 160 determines the list of eligible digital content items for a client device 180 based on which object identifiers specified in object identifier row 150a represent the client device 180. This ensures that the evaluation platform system 160 returns, for presentation, a digital content item 165 for an object for which the user of the client device has expressed interest (e.g., by visiting a webpage hosting content related to the object).

In response to a conversion or other action on a website (e.g., indication that a purchase has been made), the content provider system 170 provides notice to the evaluation platform system 160. The data processing system 100 removes the client device identifier of the list 150z from the corresponding audience segment by removing the mapping of the client device identifier to the object identifier 150w. The evaluation platform system 160 removes the cookie data 185 from the browser of the client device 180 that indicates that the user has an interest in that object. In some implementations, the client device 180 stores other, different cookie data indicating that the client device has made a conversion (e.g., purchased the object of the object identifier 150w). This additional cookie data is readable by subsequently-visited content provider systems. As a result, those content provider systems know not to send instructions to the networking interface system 110 to place the user into an audience segment corresponding to the subject matter.

The networking interface system 110 communicates with the content provider system 170 and the client device 180 using a network (not shown). The network includes one or more sub-networks. The network(s) provide for communications under various modes or protocols, such as Global System for Mobile communication (GSM) voice calls, Short Message Service (SMS), Enhanced Messaging Service (EMS), or Multimedia Messaging Service (MIMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication occurs through a radio-frequency transceiver. In addition, short-range communication occurs, such as using a Bluetooth®, WiFi®, or other such transceiver.

An example client device 180 is an electronic device that is under control of a user and that is capable of requesting and receiving resources over the network. A client device 180 can include one or more processing devices, and can be, or include, a mobile telephone (e.g., a smartphone), a laptop computer, a handheld computer, an interactive or so-called "smart" television or set-top box, a tablet computer, a network appliance, a camera, an enhanced general packet radio service (EGPRS) mobile phone, a media player, a navigation device, an email device, a game console, or a combination of any two or more of these data processing devices or other data processing devices.

The client device 180 includes/stores one or more user applications, such as a browser, to facilitate the sending and receiving of data over network. In some implementations, the client device 180 is mobile ("mobile device"), such as a smartphone or a table computer, and can include an application ("app") that allows the user to conduct a network (e.g., web) search.

When the content 175 (e.g., webpage data, search results, etc.) are requested by a client device 180, the evaluation platform system 160 receives a request for one or more digital content item 165 to be provided with the content 175. The request for the digital content items 165 includes characteristics of one or more "slots" that are defined for the content 175 that is requested. For example, data representing the content 175 can include data specifying a portion of content 175 or a portion of a user display, such as a presentation location of a pop-up window or a slot of a third-party content site or webpage, in which the content 175 can be presented. Search results pages can also include one or more slots in which the digital content item 165 is presented for the client device 180.

The content provider system 170 provides data about slots to the evaluation platform system 160. For example, the content provider system 170a provides data including a content identifier (e.g., URL) of the content 175 for which the slot is defined, a size of the slot, and/or media types that are available for presentation in the slot, to the network interface system 110. Similarly, object titles (such as object title 150y) and eligible content items list 190 associated with requested content 175 are also provided to the evaluation platform system 160 to facilitate identification of content that is relevant to the client device 180.

Based on the eligible content items list 190, the evaluation platform system 160 selects content that is eligible to be provided in response to the request ("eligible digital content items"). For example, eligible digital content items include content items associated with one or more of the objects included in the object identifiers (such as object identifier 150w) mapped to the client device identifier of the list 150z.

Figure 2:
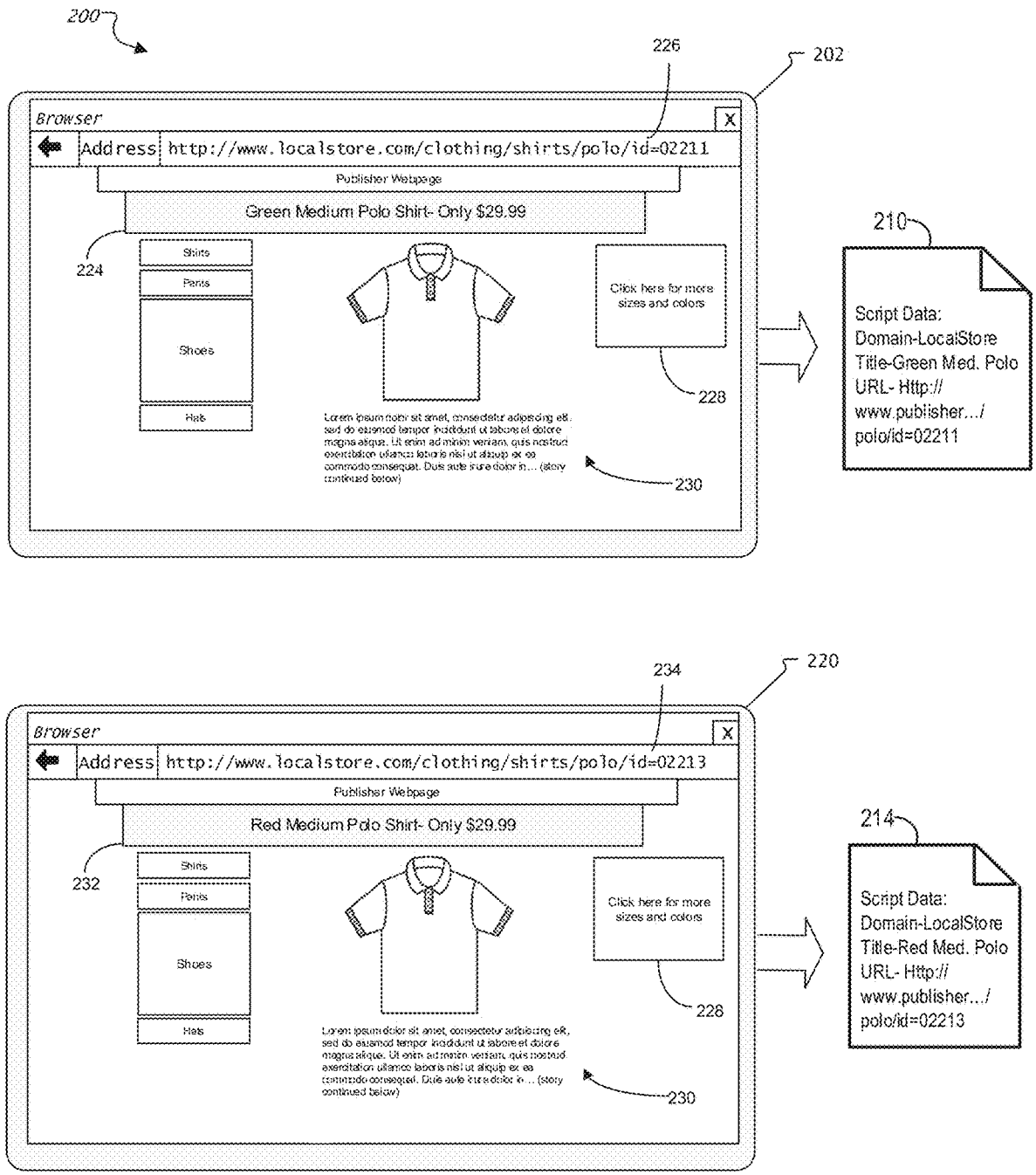
FIG. 2 shows representative user interfaces.

Referring to FIG. 2, a diagram 200 shows representative graphical user interfaces (GUIs) of webpages 202, 220 and example script tag data 210, 214. Webpage 202 shows a first example of script tag data 210 being extracted from content of a content provider system. The webpage 202 includes a webpage identifier 226 (a URL) of http://www/localstore-.com/clothing/shirts/polo/id=02211. A mapping engine system can parse the webpage identifier 226 and the webpage HTML (or other code for assembling the webpage content) to determine the object identifier. For example, the webpage title is "Greed Med. Polo," as indicated by the script tag data 210. The webpage identifier 226 is also included in the script tag data 210.

The mapping engine system parses the content 230 of the website 202 and the digital content items 224, 228 and performs a semantic analysis, as described above, to determine the object title. The content items 224, 228 and content 230 indicate that the object represented on the webpage is a green polo shirt of medium size. The mapping engine system determines that the object title is a "green polo shirt." The object is identified in an object feed and added to the object identifier index, if not already present.

Webpage 220 shows a second example of script tag data 214 being extracted from content of a content provider system. The webpage 220 includes a webpage identifier 234 (a URL) of http://www/localstore.com/clothing/shirts/polo/id=02213. A mapping engine system can parse the webpage identifier 234 and the webpage HTML (or other code for assembling the webpage content) to determine the object identifier. For example, the webpage title is "Greed Med. Polo," as indicated by the script tag data 214. The webpage identifier 264 is also included in the script tag data 214.

The mapping engine system parses the content 230 of the website 220 and the digital content items 232, 228 and performs a semantic analysis, as described above, to determine the object title. The content items 232, 228 and content 230 indicate that the object represented on the webpage is a red polo shirt of medium size. The mapping engine system determines that the object title is a "red polo shirt." The object is identified in an object feed and added to the object identifier index, if not already present.

The mapping engine system identifies that the webpages 202 and 220 have the same domain, and are from the same content provider system. The mapping engine finds patterns in the webpage identifiers 226, 234, of webpages 202, 220, respectively. Based on comparing the webpage identifiers 226, 234 of the domain "localstore.com" to each other, the mapping engine system determines that the object identifiers are after "id=" characters, are offset three characters from a grouping identifier "polo," (and another grouping identifier "clothing"), and include five digit sequences that begin with the numbers "022," (which may indicate an object group of "clothing," "polo," etc.). The mapping engine system identifies the object identifiers as "02211" for a "green polo shirt" and "02213" for a "red polo shirt," the object titles identified previously. The mapping engine system maps the object titles, accessing device identifier retrieved from cookie data, and determined object identifiers into entries of the object identifier index. When the device requests content from the domain of webpages 202, 220, digital content items representing objects "green polo shirt" and "red polo shirt" are tagged as eligible digital content items for the evaluation platform system evaluation process.

Figure 3:
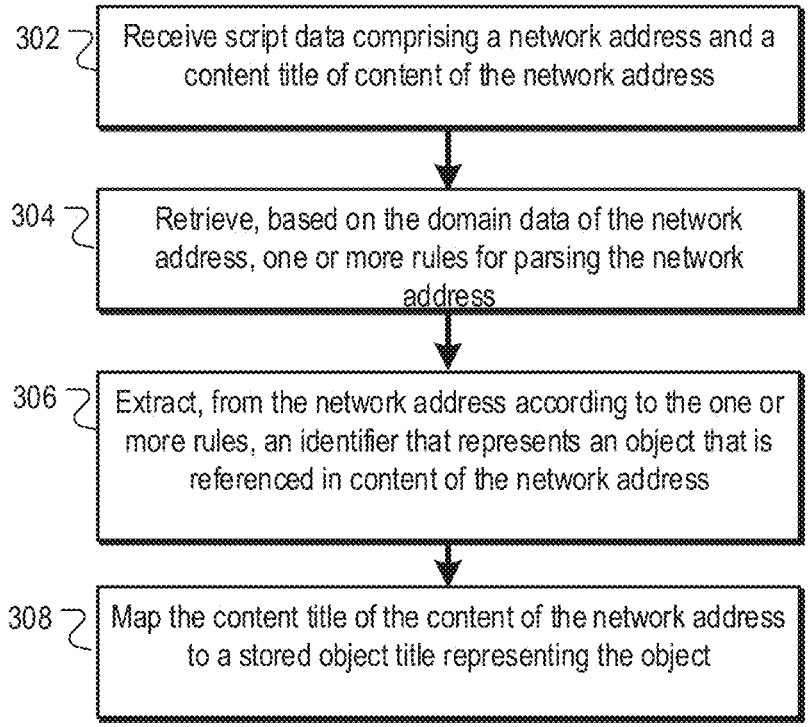
FIG. 3 is a flow diagram showing actions for generating an object identifier index.

FIG. 3 is a flow diagram showing actions for generating an object identifier index. A data processing system receives (302) script data including a network address and content titles of content of the network address. The data processing system retrieves (304), based on the domain data of the network address, one or more rules for parsing the network address. The data processing system extracts (306), from the network address according to the one or more rules, an identifier that represents an object that is referenced in the content stored at the network address. The data processing system maps (308) the content title of the content of the network address to the stored object title representing the object.

Figure 4:
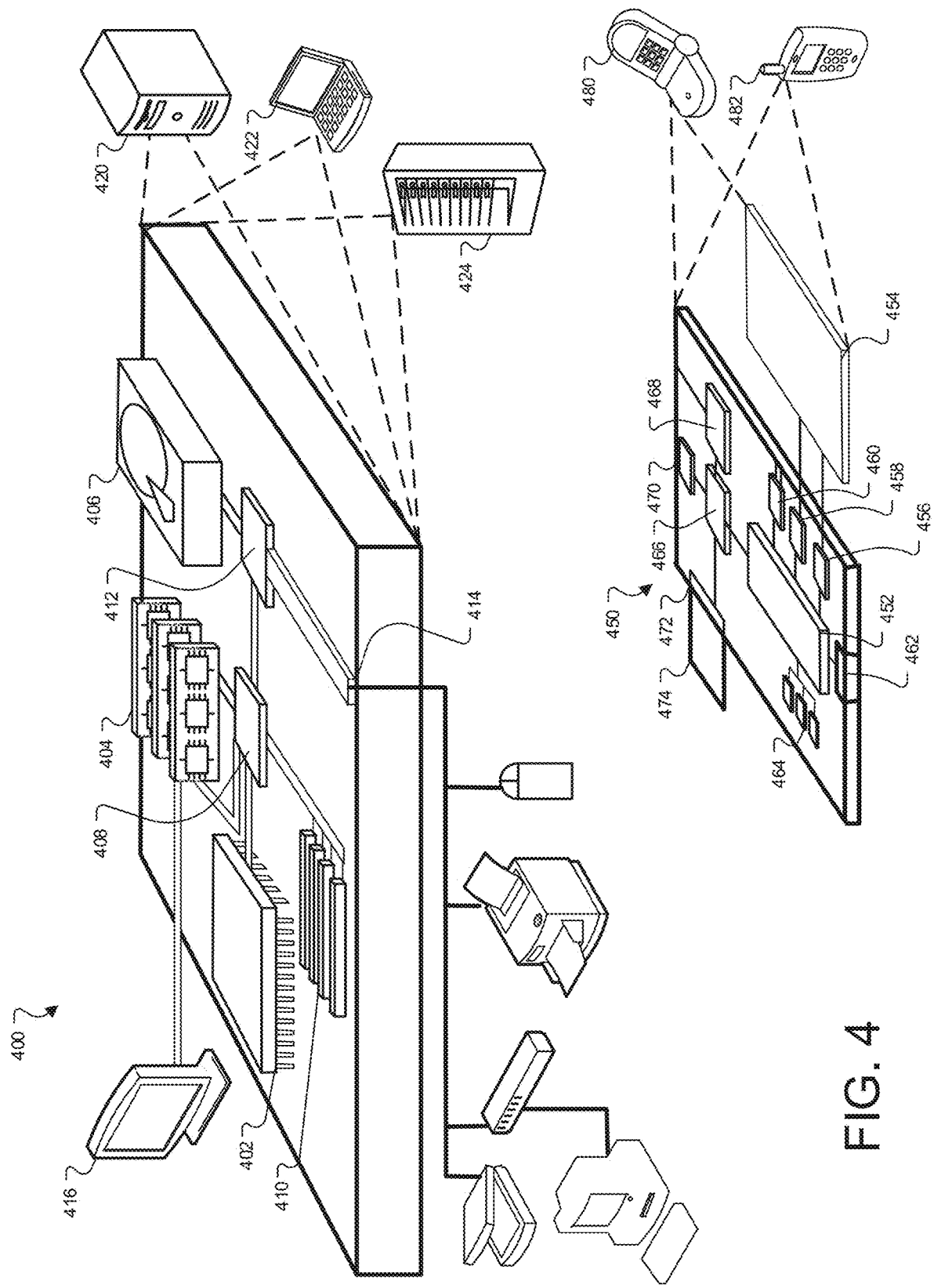
FIG. 4 is a block diagram of components of a system for logical segmentation data processing.

FIG. 4 shows example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally, computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various buses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic, computer-readable hardware storage device or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be in communication with processor 452, so as to enable near area communication of device 450 with other devices. External interface 462 may provide, for example, for wired communication, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In-Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480.

It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Elements of different implementations described herein can be combined to form other implementations not specifically set forth above. Elements can be left out of the processes, computer programs, etc. described herein without adversely affecting their operation. In addition, the logic flows depicted in the figures do not require the particular order shown, or sequential order, to achieve desirable results. Various separate elements can be combined into one or more individual elements to perform the functions described herein.

Other implementations not specifically described herein are also within the scope of the following claims.

What is claimed is:

1. A data processing system, including one or more processors, that generates a mapping between entries in an index to determine an object represented by digital content of a network address, the data processing system comprising:
   a network interface system that receives, from a static script tag executed at a client device, script data specifying (i) a device identifier of the client device, (ii) a network address of digital content presented at the client device and (iii) a content title of the digital content accessible at the network address, wherein the network address comprises domain data;
   a data retrieval interface that retrieves, based on the domain data of the network address, executable logic for parsing the network address;
   a parsing engine that extracts, from the network address and by executing the executable logic, an identifier of an object that is depicted in the digital content accessible at the network address;
   a search engine that searches an index to identify a first entry with indexed data representing a descriptor of the object; and
   a mapping engine that:
      generates, in the index, a second entry specifying (i) the content title of the digital content accessible at the network address and (ii) the identifier of the object that is depicted in the digital content accessible at the network address; and
      generates, in the index, a mapping between the first entry, the second entry, and the device identifier, wherein after generating the mapping between the first entry, the second entry, and the device identifier, the data processing system:
         receives a request for a content item from the client device;
         identifies the device identifier of the client device in the index; and
         returns, responsive to the request for the content item, a given content item selected using one or more of the descriptor of the object or the identifier of the object that are mapped to the device identifier in the index.

2. The data processing system of claim 1, wherein the descriptor includes an object title that describes a product represented by the descriptor.

3. The data processing system of claim 1, wherein the second entry includes two sub entries that are linked together.

4. The data processing system of claim 1, wherein the mapping engine matches the identifier of the object to a stored object title based on the mapping of the first entry to the second entry in the index.

5. The data processing system of claim 1, wherein the index enables a retrieval of a content item representing the object with a reduced latency relative to a latency caused by retrieval of the content item representing the object independent of the index.

6. The data processing system of claim 1, wherein the parsing engine analyzes a plurality of network addresses of a domain specified by the domain data and compares each of the plurality of the network address to other network addresses to determine one or more rules for the domain specified by the domain data.

7. The data processing system of claim 1, wherein the identifier of the object comprises a product identifier, and wherein the object comprises a product.

8. The data processing system of claim 1, wherein the content title is a first content title, and wherein a second content title is not unique from the first content title, and wherein upon detection of the second content title being not unique, the mapping engine removes, from the index, the first entry including the first content title and an additional entry including the second content title.

9. The data processing system of claim 1, wherein the mapping engine maps the first entry and the second entry using a lookup table.

10. A method performed by one or more processing devices for generating a mapping between entries in an index to determine an object represented by digital content of a network address, the method comprising:
    receiving, from a static script tag executed at a client device, script data specifying (i) a device identifier of the client device, (ii) a network address of digital content presented at the client device and (iii) a content title of the digital content accessible at the network address, wherein the network address comprises domain data;
    retrieving, based on the domain data of the network address, executable logic for parsing the network address;
    extracting, from the network address and by executing the executable logic, an identifier of an object that is depicted in the digital content accessible at the network address;
    searching an index to identify a first entry with indexed data representing a descriptor of the object; and
    generating, in the index, a second entry specifying (i) the content title of the digital content accessible at the network address and (ii) the identifier of the object that is depicted in the digital content accessible at the network address;
    generating, in the index, a mapping between the first entry, the second entry, and the device identifier;
    after generating the mapping between the first entry, the second entry, and the device identifier:
        receiving a request for a content item from the client device;
        identifying the device identifier of the client device in the index; and
        returning, responsive to the request for the content item, a given content item selected using one or more of the descriptor of the object or the identifier of the object that are mapped to the device identifier in the index.

11. The method of claim 10, wherein the descriptor includes an object title that describes a product represented by the descriptor.

12. The method of claim 10, further comprising matching the identifier of the object to a stored object title based on the mapping of the first entry to the second entry in the index.

13. The method of claim 10, wherein the index enables a retrieval of a content item representing the object with a reduced latency relative to a latency caused by retrieval of the content item representing the object independent of the index.

14. The method of claim 10, further comprising analyzing a plurality of network addresses of a domain specified by the domain data and compares each of the plurality of the network address to other network addresses to determine one or more rules for the domain specified by the domain data.

15. A non-transitory computer readable medium storing instructions operable to cause one or more processing devices to perform operations comprising:
    receiving, from a static script tag executed at a client device, script data specifying (i) a device identifier of the client device, (ii) a network address of digital content presented at the client device and (iii) a content title of the digital content accessible at the network address, wherein the network address comprises domain data;
    retrieving, based on the domain data of the network address, executable logic for parsing the network address;
    extracting, from the network address and by executing the executable logic, an identifier of an object that is depicted in the digital content accessible at the network address;
    searching an index to identify a first entry with indexed data representing a descriptor of the object; and
    generating, in the index, a second entry specifying (i) the content title of the digital content accessible at the network address and (ii) the identifier of the object that is depicted in the digital content accessible at the network address;
    generating, in the index, a mapping between the first entry, the second entry, and the device identifier;
    after generating the mapping between the first entry, the second entry, and the device identifier:
        receiving a request for a content item from the client device;
        identifying the device identifier of the client device in the index; and
        returning, responsive to the request for the content item, a given content item selected using one or more of the descriptor of the object or the identifier of the object that are mapped to the device identifier in the index.

* * * * *

UNITED STATES PATENT AND TRADEMARK OFFICE
CERTIFICATE OF CORRECTION

| | | |
|---|---|---|
| PATENT NO. | : 10,909,100 B2 | Page 1 of 1 |
| APPLICATION NO. | : 15/695584 | |
| DATED | : February 2, 2021 | |
| INVENTOR(S) | : Agrawal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 544 days.

Signed and Sealed this
Sixth Day of September, 2022

Katherine Kelly Vidal
*Director of the United States Patent and Trademark Office*